United States Patent
Bendelli et al.

(10) Patent No.: US 6,631,245 B1
(45) Date of Patent: Oct. 7, 2003

(54) DEVICE FOR EXTRACTING AND INSERTING OPTICAL CARRIERS IN OPTICAL COMMUNICATIONS NETWORKS

(75) Inventors: Giampaolo Bendelli, Almese (IT); Luigi Gastaldi, Fiano Torinese (IT)

(73) Assignee: Agilent Technologies, Inc., Palo Alto, CA (US)

( * ) Notice: Subject to any disclaimer, the term of this patent is extended or adjusted under 35 U.S.C. 154(b) by 567 days.

(21) Appl. No.: 09/667,672

(22) Filed: Sep. 22, 2000

(30) Foreign Application Priority Data

Sep. 23, 1999 (IT) ......................................... TO99A0816

(51) Int. Cl.[7] ............................................... H04J 14/02
(52) U.S. Cl. ............................. 398/83; 398/82; 398/84; 398/87; 398/45; 398/57
(58) Field of Search ............................. 398/45, 57, 82, 398/83, 84, 87

(56) References Cited

U.S. PATENT DOCUMENTS 6,208,441 B1 * 3/2001 Jones et al. .................... 398/87
6,348,984 B1 * 2/2002 Mizrahi ........................ 398/79
6,449,072 B1 * 9/2002 Sian et al. ..................... 398/82

OTHER PUBLICATIONS

"Add–Drop Ottici per reti WDM." G. Bendelli et al. "Fotonica 97" Rome, Italy, May 20–23, 1997.
"Self–healing WDM ring networks with all–optical protection path", A.F. Elrefaie. OFC'92 conference, San José, USA, Feb. 2–7, 1992.

* cited by examiner

Primary Examiner—Leslie Pascal
Assistant Examiner—Dzung Tran

(57) ABSTRACT

The device, which has a modular structure, makes use of Bragg gratings for selecting, from a wavelength division multiplexed stream, a carrier to be inserted or extracted, and optical circulators for receiving the stream, for extracting and inserting the carriers and for sending the multiplexed stream to the output after the extraction and insertion of the carriers. The grating and the receiving-extracting circulator are located in a structural module which is replicated for all the channels to be extracted and inserted. Each module also has points accessible from the exterior for the connection of a plurality of modules in series, to establish the following for the multiplexed stream: A) a direct path between one input of the module and one input of the receiving and extracting circulator of the module to which it belongs, if this is the only module or is the last of a plurality of modules; B) a second path which passes through the receiving or extracting circulator and the selection means of the subsequent modules, where there is a plurality of modules, and for all the modules except the last. (FIG. 2)

10 Claims, 4 Drawing Sheets

DEVICE FOR EXTRACTING AND INSERTING OPTICAL CARRIERS IN OPTICAL COMMUNICATIONS NETWORKS

The present invention relates to optical communications networks and more particularly to a device for extracting, from a stream of optical signals comprising a plurality of carriers, one or more carriers, modulated by corresponding information signals, and inserting into the stream one or more other carriers, modulated in turn by corresponding information signals which are normally different from the preceding ones.

These devices are commonly known in the art by the abbreviation OADM, from the initials of "Optical Add-Drop Multiplexer". The devices form a key element for making nodes with wavelength-based routing functions in wavelength division multiplexing communications networks: in this case they are used for extracting from the multiplexed stream one or more channels containing the information addressed to a user or users connected to the node, while allowing the remaining channels to pass unaltered, and adding to the multiplexed flow one or more channels which carry the information generated within the node. In practice, to optimize the use of the optical band, it is convenient to allocate the extracted channel and the added channel (or each pair consisting of an extracted channel and an added channel) to the same wavelength position.

Among the various characteristics which a device of this type must have, the scalability and modularity in respect of extracted and inserted channels are particularly important for the purposes of permitting a gradual and economical increase of the capacity of the node in accordance with the growth in traffic generated and received in the node. The term "scalability" denotes the capacity to increase the number of extracted and inserted channels without degrading the channels already present (including both those in transit and the extracted and inserted channels). The term "modularity" denotes the possibility of increasing the capacity simply by adding replicas of a basic module for a single channel.

A typical system for the construction of these basic modules makes use of an element sensitive to the wavelength of the channel to be extracted and inserted, connected between a pair of circulators, one of which receives the multiplexed stream. In one example, described in European patent EP-B 0 638 837, the wavelength-sensitive element is a tunable band-pass filter of the Fabry-Perot resonant cavity type formed in the fibre, which transmits the resonance wavelength and reflects all the others. With this arrangement, the channels in transit pass out, by reflection in the filter, through a port of the circulator through which the multiplexed stream enters the device, while the channel to be extracted is transmitted to the second circulator, from which it passes out. In a symmetrical way, the new channel is introduced through the second circulator and is transmitted by the filter, thus being inserted into the stream in transit.

In more recent versions of the same system, the wavelength-sensitive element is an in-fibre Bragg grating, which reflects the resonance wavelength and transmits all the others, so that the channel to be extracted is reflected by the grating towards the same circulator which has received the multiplexed stream and passes out of it, while the channels in transit proceed towards the second circulator, through which is inserted the new channel which, by reflection in the grating, will pass out of the second circulator together with the channels in transit.

A structure of this type is described, for example, in the paper "Add-Drop Ottici per reti WDM", presented by G. Bendelli et al. at the "Fotonica 97" conference in Rome, Italy, 20–23 May 1997, and published on pp. 18 ff. of the conference proceedings.

Because of the excellent spectral characteristics of in-fibre Bragg gratings and the high isolation between the ports of the circulators, it is possible to construct devices having high performance in terms of both wavelength selectivity and inter-channel crosstalk.

One limitation present in the aforementioned devices is the low scalability in terms of the increase of the channels extracted and inserted in a node, since this would require either the insertion of additional elements in series between the circulators or the insertion of replicas of the device in series.

The first solution, although particularly simple, has two main drawbacks:

the interruption, throughout the time required by the operations of adding the elements, of the connections supported by the channels passing through the node (both those in transit and those inserted or extracted, depending on whether the grating is added upstream or downstream of the existing grating);

the necessity of separating the channels extracted from the single extraction port.

The second solution, which is described in the European patent cited above, also requires the interruption of the traffic during the operations of adding elements; it also entails a redundancy of expensive optical components such as optical circulators.

The object of the present invention is a new configuration of a wavelength extraction-insertion device based on Bragg gratings and circulators, intended to improve the properties of both scalability and modularity of the design in terms of the number of channels extracted and inserted, while reducing to a minimum the periods of interruption of the service and not requiring the replication of expensive components.

The device according to the invention comprises:

wavelength-sensitive means for selecting the carrier or carriers within the stream means for receiving the stream and extracting the carrier or carriers, which receive the multiplexed stream and transfer it to the selection means, and send the selected carrier or carriers to user devices; and output means for the multiplexed stream after the extraction and insertion of the carrier or carriers, and is characterized in that the said means for receiving the stream and extracting a carrier and the said selection means are inserted in a structural module which is replicated for each of the carriers to be inserted and extracted and in which the selection means are capable of selecting a corresponding carrier which is sent to the exterior by the receiving and extracting means of the module, and in that each module also comprises connection points, located on the path of the multiplexed stream, which are accessible from the exterior and are designed for the connection of a plurality of modules in series, in such a way as to establish for the multiplexed stream a first path which is a direct path between an input of the module and an input of the receiving and extracting means of the module to which it belongs, if this module is the only one or is the last of the series of modules, or, when the said series of modules is present, and for all the modules except the last, a second path which passes through the receiving and extracting means and the selection means of the subsequent modules.

For further clarification, reference should be made to the attached drawings, in which.

For clarity, the operation of a conventional single channel extraction and insertion device using an in-fibre Bragg grating and circulators will be described with reference to FIG. 1. A first circulator 1 receives at an input port 1A the multiplexed stream, comprising n channels at wavelengths $\lambda_1 \ldots \lambda_i \ldots \lambda_n$, transmitted on the input branch 10E of a line 10, and sends it to an input-output port 1B to which is connected one end of an in-fibre Bragg grating 2, resonating at a given wavelength $\lambda_i$ of the multiple. The radiations of the channel at this wavelength are reflected by the grating 2, re-enter the circulator 1 through the port 1B, and pass out through the port 1C. The other channels pass into the second circulator 3 through the port 3A and proceed towards the output port 3B. The channel to be inserted, also at the wavelength $\lambda_i$, is applied to the port 3C of the circulator 3, passes into the grating 2 through the port 3A, is reflected, re-enters the circulator 3 through the same port 3A and passes out through the port 3B together with the other channels in transit. The complete multiplexed stream is therefore again present on the output branch 10U of the line 10.

Figure 1:
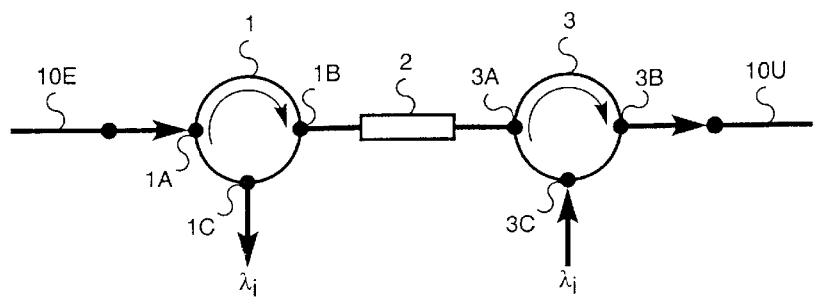
FIG. 1 is the schematic diagram of an extraction and insertion device of a single channel using an in-fibre Bragg grating and circulators.
Figure 2:
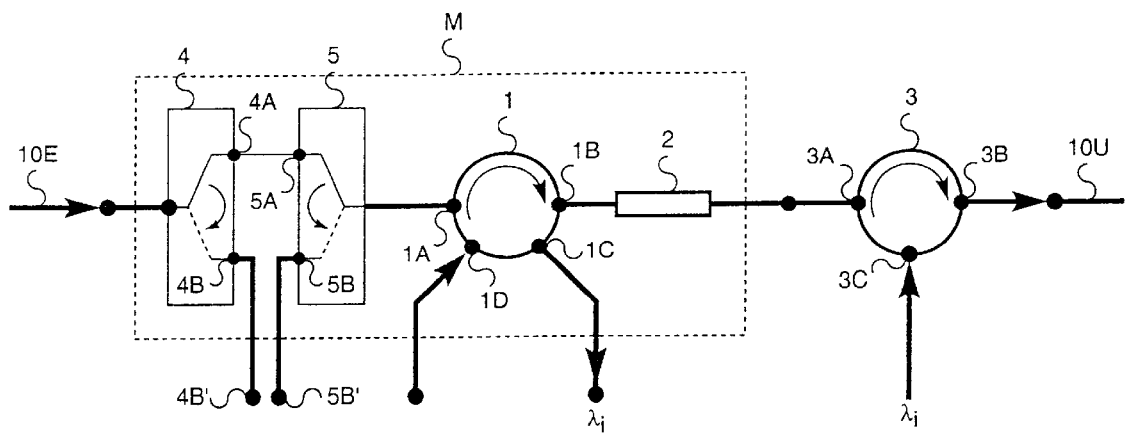
FIG. 2 is a diagram of the device to which the invention relates, again for the extraction and insertion of a single channel in a first embodiment.

In FIG. 2, the device according to the invention, in the version for the extraction and insertion of a single channel, again comprises the pair of circulators 1 and 3 and the in-fibre Bragg grating 2, connected together in the same way as the circulators and the grating of FIG. 1. In this case, however, the circulator 1 is a 4-way circulator, with a further input port 1D which is used only in devices for the extraction and insertion of a plurality of channels, as will be explained subsequently. Additionally, a pair of optical switches 4, 5, the first of which is a 1×2 switch and the second is a 2×1 switch, are provided upstream of the circulator 1. There are no particular requirements in respect of the switching speeds of the switches 4, 5 (switching speeds of the order of a millisecond or a few milliseconds are sufficient). Switches of this type are easily available on the market. Purely by way of example, we may mention the SN range of in-fibre switches made by JDS FITEL Inc. of Nepean, Ontario, Canada.

The set of switches 4, 5 of the circulator 1 and the grating 2 forms a structural module (indicated by M) which is to be replicated for each of the channels to be extracted and inserted. The input of the switch 4 is connected to the incoming branch 10E of the line 10 and now forms the input of the device; a first output 4A of the same switch is connected to a first input 5A of the switch 5, whose output is in turn connected to the input 1A of the circulator 1. The second output 4B of the switch 4 and the second input 5B of the switch 5, on the other hand, are inactive and will be used for the connection of a further module M, when it is necessary to insert or extract a new channel: for this purpose, they are made accessible from the outside of the module by means of suitable sections of fibre, forming external connection points 4B', 5B'. The operation of the device of FIG. 2 is identical to that described with reference to FIG. 1, in that the switches 4, 5 establish a direct connection between the line 10E and the port 1A of the circulator 1.

Figure 3:
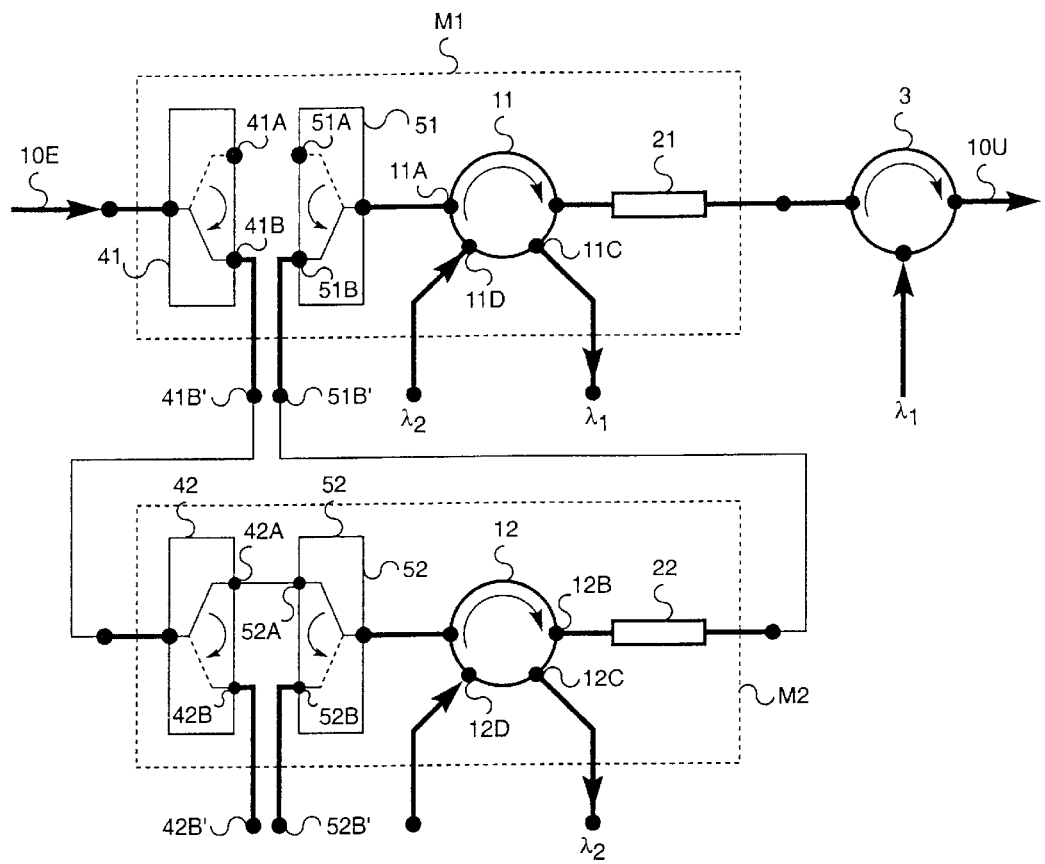
FIG. 3 is a diagram of the device to which the invention relates, for the extraction and insertion of two channels.

FIG. 3 shows a device capable of extracting and inserting two channels, and therefore comprising two modules M1, M2, of which the module M1 is the one corresponding to the basic module M of FIG. 2 and is therefore connected at one end to the branch 10E of the transmission line 10 and at the other to the circulator 3. The identical elements in the two modules are identified by references formed by adding the digit 1 or 2, respectively, to the numeric references used in FIG. 2. The two gratings 21, 22 clearly resonate at difference wavelengths, e.g. $\lambda_1, \lambda_2$. In this configuration, the switch 41 of M1 has been switched to transfer the multiplexed stream to the output 41B, and the switch 51 has been switched to transfer the signals present at the input 51B to the circulator 11. The fourth path 11D of the circulator 11 is used for the insertion of the channel at wavelength $\lambda_2$. In this case, the external access points 41B', 51B' associated with the switches 41, 51 are connected to the input and the output, respectively, of the module M2, and therefore to the input of the switch 42 and to the transmission output end of the grating 22. The switches of M2 are in the same configuration as that shown for the switches 4, 5 in FIG. 2 and therefore the access points 42B', 52B' are not used. Also, the port 12D of the circulator 12 is not used, but is available as an insertion port if any additional module should be added, as described below.

With this arrangement, the multiplexed stream present on the branch 10E of the line is received by the switch 41 and sent to the input of the module M2, where the switches 42, 52, which are connected directly to each other, send it to the grating 22. This reflects the channel at wavelength $\lambda_2$ which is extracted by means of the circulator 12, in a way completely identical to that described for the case of extraction and insertion of a single channel. The other channels are transmitted by the grating 22 and re-enter the module M1 through the input 51B of the switch 51. The channel at wavelength $\lambda_2$ is reintroduced into the transit stream by means of the circulator 11 (port 11D). The multiplexed stream again comprises the same channels as those of the multiplexed stream present on the line 10E: therefore, as described for the case of extraction and insertion of a single channel, the grating 21 reflects towards the circulator 11 the channel at wavelength $\lambda_1$, which is extracted by means of this circulator, while the channel at wavelength $\lambda_1$ is reintroduced into the stream by means of the output circulator 31.

The same operating principle applies in the case of extraction of more than two channels. In a generic module Mx along the chain, the channel at the resonance wavelength $\lambda_x$ of the grating $2x$ is extracted, and both the channel at the wavelength $\lambda_x$ and that at the resonance wavelength $\lambda_{x+1}$ of the grating of the immediately following module. In the last module, the switches 4, 5 will be connected as shown for the module M2 of FIG. 3 and the port D of the circulator 1 will remain inactive, and therefore only the extraction of the channel will take place.

Clearly, the invention resolves the problems indicated above. This is because the period of interruption of the service of the network due to the addition of a module is limited to the switching time of the switches 4, 5 of the module or of the last pre-existing module, when the new module has been physically connected to the device. The physical connection of the new module (connection of the input and the output to the access points 4B', SB') does not require interruption of the service, by contrast with what would happen if a module such as that of FIG. 1 had to be replicated. Furthermore, since each module is provided with its own circulator for the extraction of the channel, there are no problems connected with any use of a single extraction port. Finally, only one of the circulators has to be replicated as many times as there are wavelengths to be extracted, and therefore the costs of the device are held down since, as is known, a pair of switches without particular requirements in terms of switching speed, such as those required for the device, costs less than a circulator.

FIGS. 4–8 show variants of the invention adapted for application in a node of a wavelength division multiplexed optical communications network, with a loop structure and automatic protection in the optical multiplex section (OMS). As is known, this term indicates a protection which, in case of a fault, acts on the whole set of channels, routing them on to a reserve line. A network of this type therefore comprises two communication lines 100, 200, the first of which is the traffic line used to convey the multiplexed stream in regular service conditions, while the second is the protection or reserve line which is used in the direction opposite to the former. Additionally, the nodes are provided with loop-back switches 40 and 50, which are located respectively at the input and output of the node, and which are 2×2 matrices designed to establish the connection between the lines 100 and 200 to permit the loop-back of the traffic in case of a fault. In the following description, the terms input/output and downstream/upstream refer to the direction of propagation along the line 100. The letters A, B, C, D indicate the four ports of the switches 40, 50: the ports A, B are the input and output ports connected to the line 100 and the other two are the input-output ports for the line 200. In the absence of a fault, the switches 40–50 are set to the straight-through ("bar") state and connect two lengths of the same line 100 and 200 to each other, while in case of a fault they will be switched in such a way as to make the traffic pass from the line 100 to the line 200 immediately upstream of a fault and to return the traffic to the line 100 after it has travelled round the loop in the reverse direction to a point immediately downstream of the fault. The input (E) and output (U) sections of the lines 100, 200 are indicated by 100E, 100U, 200E, 200U.

A network of this type is described, for example, in the paper "Self-healing WDM ring networks with all-optical protection path", presented by A.F. Elrefaie at the OFC'92 conference, San José, USA, Feb. 2–7, 1992.

Figure 4:
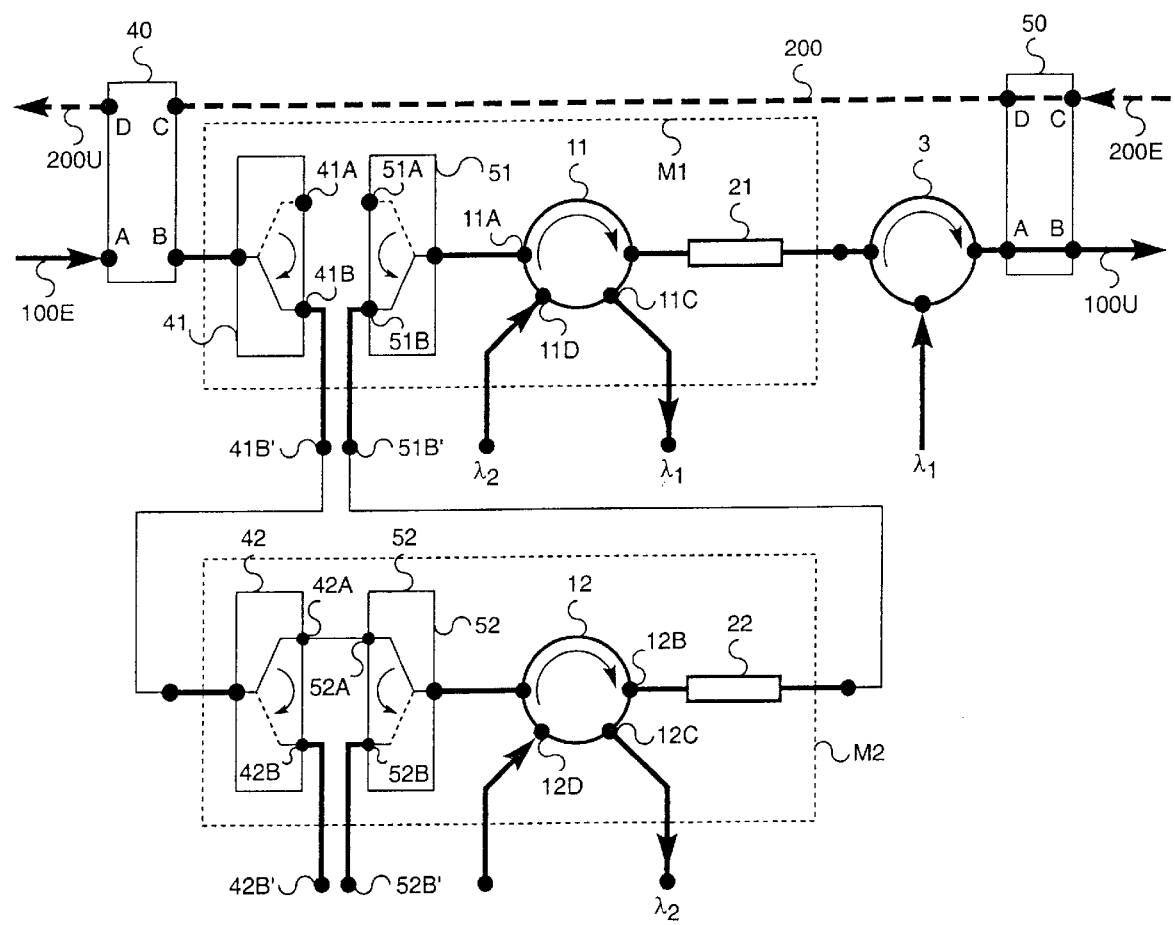
FIG. 4 is a diagram, similar to FIG. 2, relating to a device usable in a node with automatic protection in the optical multiplexing section.

A first solution for adapting the invention to these networks, shown in FIG. 4 for the case of extraction and insertion of two channels, is based on the use of modules identical to those used in the diagrams in FIGS. 2, 3, and keeps the extraction and insertion function of the channels separate from the protection function. As may be seen, the device is connected in series with the traffic line 100, the input of the switch 41 of the module M1 being connected to the output B of the loop-back switch 40 and the circulator 3 being connected to the input A of the switch 50. The protection line 200 is not affected by the presence of the device, and will directly connect the output D of the switch 50 to the input C of the switch 40. The operation is identical to that described in relation to FIG. 3.

A second solution, shown in FIGS. 5–8, makes use of matrices similar to those used for the loop-back switches 40, 50 to carry out the functions of the switches 4 (41, 42) and 5 (51, 52) of FIGS. 2–4, and therefore combines the protection function with the extraction and insertion function.

Figure 5:
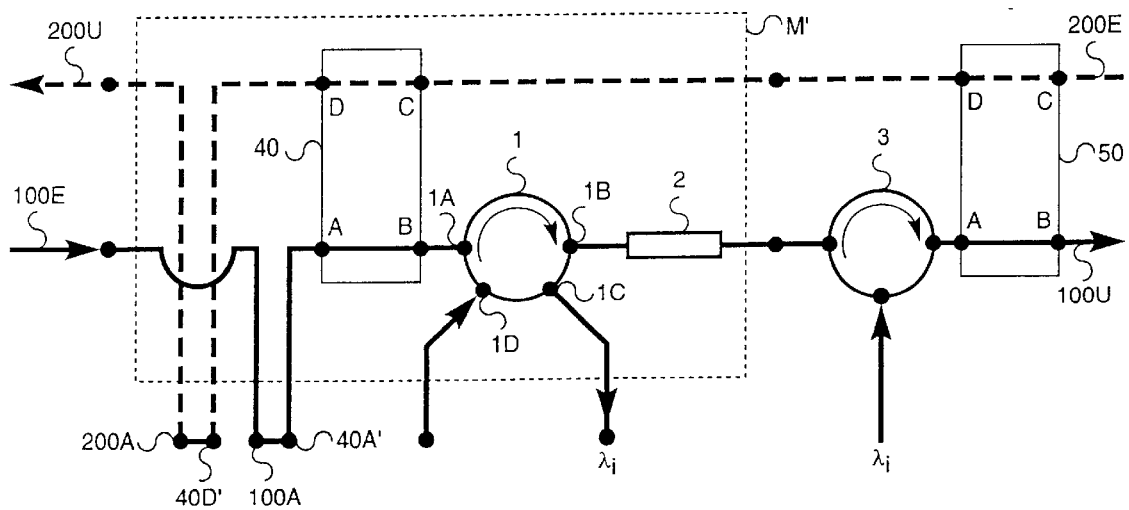
FIG. 5 is a diagram similar to FIG. 3, making use of the module shown in FIG. 4.

For clarity, the case in which the node carries out the extraction and insertion of a single channel, and therefore comprises only one basic module added to the corresponding output circulator, will be illustrated initially with reference to FIG. 5. The circulators and the gratings are indicated by the same symbols as those used in FIGS. 2, 3. The loop-back switch 40 at the input of the node is connected upstream of the circulator 1 within the basic module M' and in this case carries out the functions of the switches 4, 5 of FIG. 2, while the output switch 50 is external to the module and is connected downstream of the circulator 3. With this arrangement, since the extraction and insertion function is no longer independent of the protection function, the addition of a module for a second channel will require two pairs of connection points similar to the points 4B', 5B' of FIG. 2, one on the traffic path and the other on the protection path. For this purpose, the ports A, D of the switch 40 are made accessible from the outside of the module M', forming connection points 40A', 40D'. The lines 100, 200 will have respective external termination points 10A, 200A in the proximity of the points 40A', 40D' respectively, to form the second connection point of each pair.

The operation of the device is similar to that examined previously for FIG. 2. This is because, in the case of regular operation of the network, the traffic is routed only along the line 100, and the switch 40, in the "straight through" position, sends the incoming stream to the circulator 1, the grating 2, and the circulator 3, while the switch 50, also in the "straight through" position, sends the stream leaving the circulator 3 to a subsequent node. It will be seen immediately that a fault causing the switching of the switches 40, 50 for protection purposes has no effect on the channel extraction and insertion function carried out by the module M'.

Figure 6:
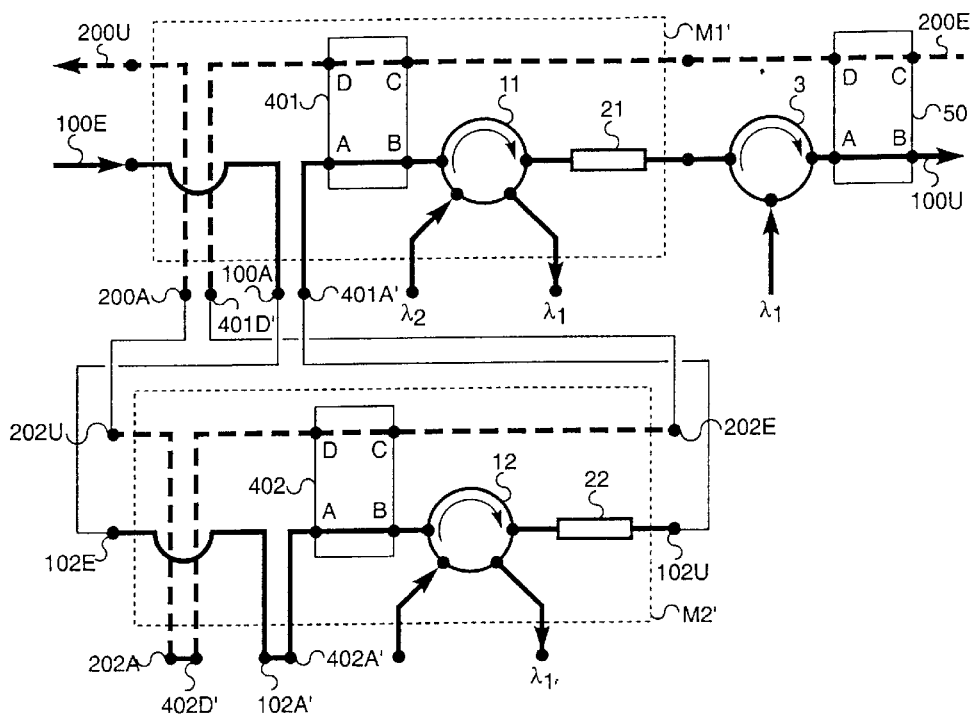

FIG. 6 shows a device for the extraction and insertion of two channels, corresponding to that of FIGS. 3 and 5. The two modules are indicated by M1', M2', and the identical elements in the two modules are again identified by references terminating in the digits 1, 2. The connections points 100A, 401A' of the module M1' are in this case connected to an input 102E and an output 102U, respectively, of the module M2 for the traffic path, while the connection points 401D', 200A of the module M1' are in this case connected to an input 202E and an output 202U, respectively, of the module M2 for the protection path. The ports A, D of the switch 402, the input 102E and the output 202U will also be connected to external connection points 402A', 402D', 102A, 202A which are identical to the points 40A', 40D', 100A, 200A and are connected in the same way as these. It should be pointed out that in this situation the protection matrix is now the matrix 402 of the module M2' (or, in general, the matrix of the last module in the chain).

The operation is entirely similar to that of the circuit in FIG. 3; the comments made previously about the consequences of a loop-back from the line 100 to the line 200 are applicable in this case also.

Figure 7:
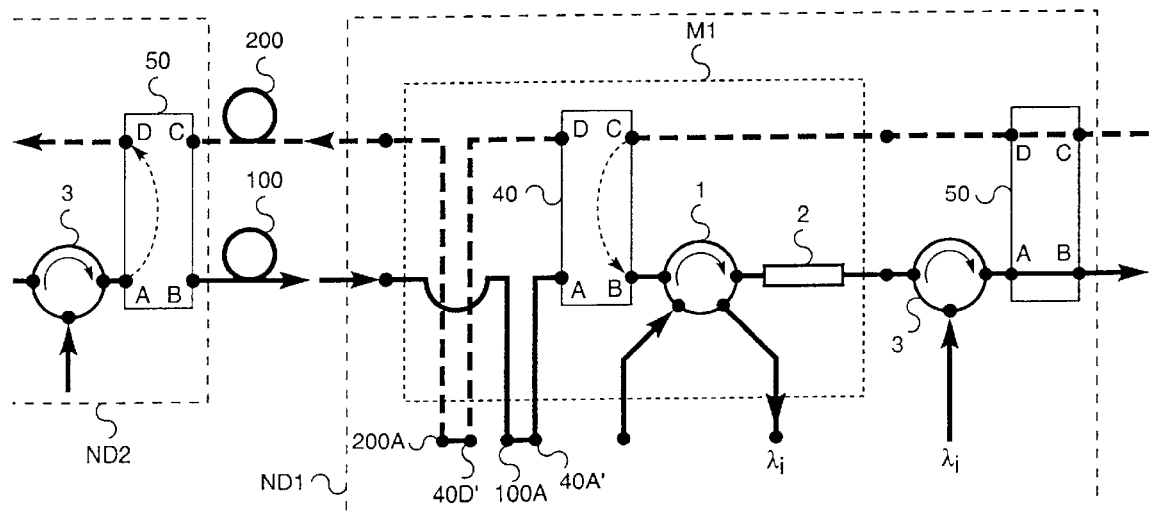
FIGS. 6–7 are diagrams relating to the operations required to change from the configuration of FIG. 4 to that of FIG. 5.
Figure 8:
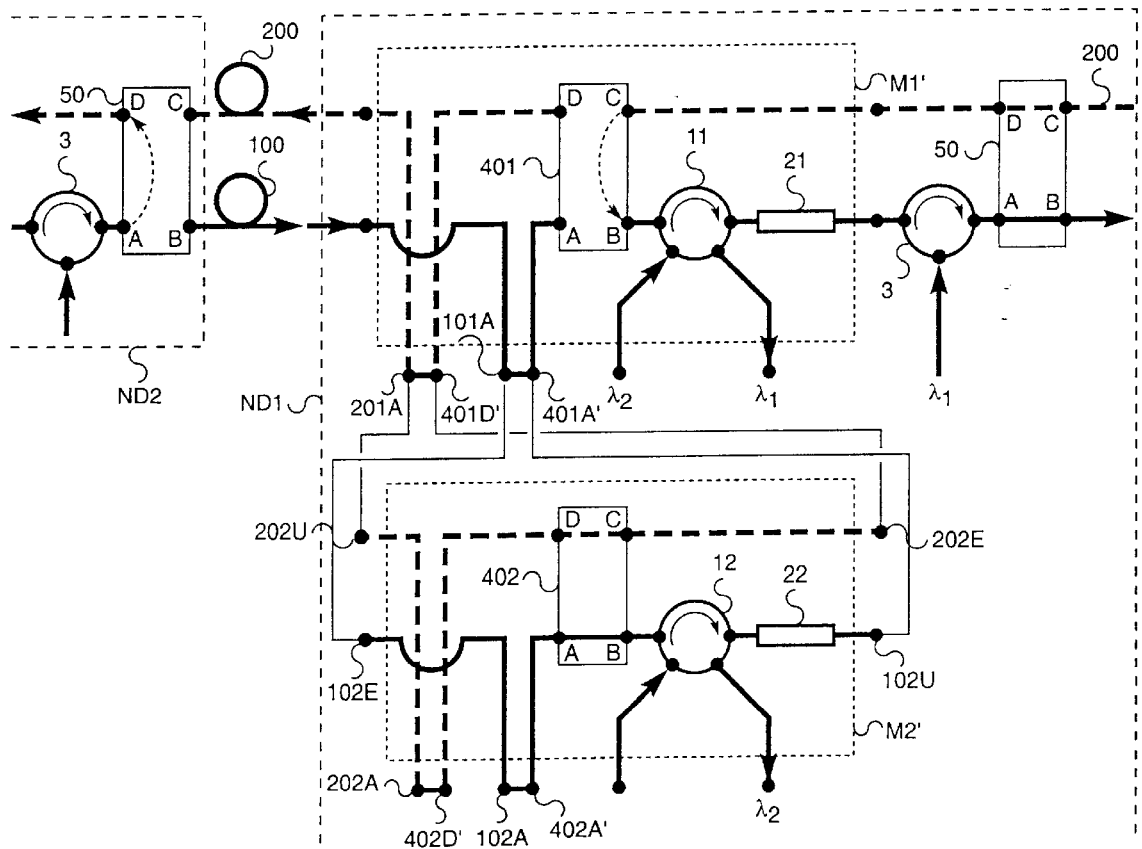
FIG. 8 is a diagram similar to FIG. 5, making use of the module shown in FIG. 2.

FIGS. 7 and 8 show the operations to be carried out for the addition of the second module M2'. The output circulator 3 and the output switch 50 of a node ND2 immediately preceding the node ND1 involved in the addition are also shown as an aid to understanding. The first step (FIG. 7) is to switch the switch 40 of the node ND1 and the switch 50 of the node ND2 to establish the connection between the line 100 and the line 200 as indicated by the arrows in broken lines within the blocks 40, 50: this configuration is that which would be present following a fault in the section between ND2 and ND1 of a network of the type concerned. In this condition, the points 100A, 401A' and 401D', 200A can be disconnected from each other and then connected, respectively, to the inputs/outputs 102E, 102U and 202E, 202U of the module M2 (prepared with its switch 402 in the "straight through" state and with the connection points 402A', 102A and 402D', 202A connected in an ordered way to establish the continuity of the traffic and protection paths, if the module M2' is the only one to be added). The configuration is that shown in FIG. 8. Finally, the switches 50 and 401 are returned to the "straight through" state, producing the configuration of FIG. 6.

The advantages of the invention examined in relation to FIGS. 2, 3 are also obtained in this case: the only difference is that two switches, rather than one, are required. It should be noted that the insertion of a module has, in practice, the same consequences as the reconfiguration of the connections when a fault occur and when the initial conditions are re-established on the re-establishment of regular operation.

The solution of FIGS. 5–8, making use of the loop-back switches which in each case have to be installed in the nodes, is less costly than the solution of FIG. 4 in terms of the number of components. By way of compensation, this simplifies the management of the network, in that it does not necessitate the simulation of fault conditions when the number of channels to be extracted and inserted has to be changed.

It is clear that the above description is provided solely by way of example and without restriction, and that variants and modifications can be produced without departure from the scope of protection of the invention. In particular, although reference has been made in the description and drawings to the use of Bragg gratings as wavelength-sensitive elements, it is possible to use different components.

What is claimed is:

1. A device for extracting one or more carriers from a stream of optical signals, comprising a plurality of wavelength division multiplexed carriers, and for inserting into the stream one or more other carriers, at the same wavelength as the extracted carrier or carriers, the device comprising:

wavelength-sensitive means for selecting the carrier or carriers within the stream;

means for receiving the stream and extracting the carrier or carriers, which receive and transfer to the selection means the multiplexed stream, and send the selected carrier or carriers to user devices;

output means for the multiplexed stream after the extraction and insertion of the carrier or carriers;

wherein the said means for receiving the stream and extracting the carrier or carriers and the said selection means are inserted in a structural module which is replicated for each of the carriers to be inserted and extracted, and in which the selection means are capable of selecting a corresponding carrier which is sent to the exterior by the receiving and extraction means of the module, and wherein each module also comprises connection points, located on the path of the multiplexed stream, which are accessible from the exterior and are designed for the connection of a plurality of modules in series, in such a way as to establish for the multiplexed stream a first path which is a direct path between an input of the module and an input of the receiving and extracting means of the module to which it belongs, if this module is the only one or is the last of the series of modules, or, when the said series of modules is present, and for all the modules except the last, a second path which passes through the receiving and extracting means and the selection means of the subsequent modules.

2. The device according to claim 1, wherein, in each module, the receiving and extracting means are capable of sending to the exterior the carrier selected by the selection means of the module and of inserting into the multiplexed stream a carrier corresponding to the carrier selected by the selection means of an adjacent module.

3. The device according to claim 1, wherein the module or each module comprises switching means upstream of the means for receiving the multiplexed stream, which can be switched between a first position in which they establish the said first path and a second position in which they direct the multiplexed stream entering the module along the said second path which extends between a first and a second connecting point.

4. The device according to claim 3, wherein the switching means comprise a first switch having one input and two outputs, in which the input is connected to a line which carries the multiplexed stream and a first output is connected to the said first external connection point, and a second switch having two inputs and one output, in which a first input is connected to the said second external connection point and the output is connected to an input of the receiving and extracting means, the said switches being capable of being set selectively to interconnect the second output of the first switch and the second input of the second switch to establish the said first path, or to interconnect the first output of the first switch and the first input of the second switch to establish the said first path.

5. The device according to claim 3 wherein the switching means comprise a first switch having one input and two outputs, in which the input is connected to a line which carries the multiplexed stream and a first output is connected to the said first external connection point, and a second switch having two inputs and one output, in which a first input is connected to the said second external connection point and the output is connected to an input of the receiving and extracting means, the said switches being capable of being set selectively to interconnect the second output of the first switch and the second input of the second switch to establish the said first path, or to interconnect the first output of the first switch and the first input of the second switch to establish the said first path, for application in nodes of a loop-type optical communications network with a traffic line and a reserve line and with automatic protection in the optical multiplexing section, the device is connected along the traffic line between a third and a fourth switch which form means for looping back the multiplexed stream from the traffic line to the reserve line and vice versa and are positioned at the input and at the output of a node respectively, the first switch of the module or of a first module of the device being capable of receiving the multiplexed stream through the said third switch.

6. The device according to claim 1 wherein, for application in nodes of a loop-type optical communications network with a traffic line and a reserve line and with automatic protection in the optical multiplexing section, a first and a second connecting point are associated with inputs and outputs of switching means positioned within each module and belonging to means of looping back the multiplexed stream from the traffic line to the reserve line and vice versa in the presence of a fault which causes an interruption in the traffic line.

7. The device according to claim 6, wherein:

the said switching means comprise a switching matrix with two inputs and two outputs, having a first input and a first output associated with the traffic line and with a first input and a first output of the module, and a second input and a second output associated with the reserve line (200) and with a second input and a second output of the module;

the said first input and the said second output are associated with the said first and the said second connecting point respectively, and a section of traffic line connected to the said first input of the module and a section of reserve line connected to the said first input of the module are associated with a third and a fourth external connecting point respectively, the connecting points being connectable selectively to each other and to inputs and outputs of an adjacent module to establish the said first and second path along the traffic line, and a third and a fourth path which involve the protection line and which are, respectively, a direct path between the second output of the switching means and the second output of the module, and a path which connects the second output of the switching means of a module and the second output of the module, passing through the subsequent modules, the third and the fourth path being active simultaneously with the first and the second path respectively.

8. The device according to claim 7, wherein when the module is the only module or is the last of a plurality of modules, the said first connecting point is connected to the said third connecting point and the said second connecting point is connected to the said fourth connecting point;

when a plurality of modules is present, then, for all modules except the last, the said first connecting point is connected to the first output of a subsequent module of the said plurality, the said second connecting point is connected to the second input of the said subsequent module, the said third connecting point is connected to the first input of the said subsequent module, and the said fourth connecting point is connected to the second output of a subsequent module of the said plurality.

9. The device according to claim 1, wherein the said means of receiving the stream and extracting the carriers and the said output means consist of optical circulators and the said wavelength-sensitive means consist of in-fibre Bragg gratings.

10. The device according to claim 9, wherein the said means of receiving the stream and extracting the carriers comprise a four-port circulator, in which one port is intended to be used for inserting into the multiplexed stream a carrier extracted in a possible subsequent module in a device comprising a plurality of modules.

* * * * *